United States Patent
Santhar et al.

(10) Patent No.: US 11,734,626 B2
(45) Date of Patent: Aug. 22, 2023

(54) COGNITIVE ANALYSIS OF A PROJECT DESCRIPTION

(71) Applicant: International Business Machines Corporation, Armonk, NY (US)

(72) Inventors: Sathya Santhar, Chennai (IN); Venkatesh Halappa, Bangalore (IN); Gerhardt Jacobus Scriven, Frisco, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 206 days.

(21) Appl. No.: 16/921,384

(22) Filed: Jul. 6, 2020

(65) Prior Publication Data
US 2022/0004951 A1    Jan. 6, 2022

(51) Int. Cl.
*G06Q 10/0631*    (2023.01)
*G06Q 10/067*    (2023.01)
(Continued)

(52) U.S. Cl.
CPC ..... *G06Q 10/06313* (2013.01); *G06F 40/279* (2020.01); *G06N 5/04* (2013.01); *G06N 20/00* (2019.01); *G06Q 10/067* (2013.01)

(58) Field of Classification Search
None
See application file for complete search history.

(56) References Cited

U.S. PATENT DOCUMENTS

| | | |
|---|---|---|
| 5,371,807 A | 12/1994 | Register et al. |
| 8,006,223 B2 | 8/2011 | Boulineau et al. |

(Continued)

FOREIGN PATENT DOCUMENTS

| | | | | |
|---|---|---|---|---|
| CN | 109597855 A | * | 4/2019 | |
| EP | 3388986 A1 | | 10/2018 | |
| WO | WO-0203256 A1 | * | 1/2002 | ........... G06F 16/285 |

OTHER PUBLICATIONS

Xirogiannopoulos, Konstantinos, and Amol Deshpande. "Extracting and analyzing hidden graphs from relational databases." Proceedings of the 2017 ACM International Conference on Management of Data. (Year: 2017).*

(Continued)

*Primary Examiner* — Shelby A Turner
(74) *Attorney, Agent, or Firm* — Garg Law Firm, PLLC; Rakesh Garg; Michael O'Keefe

(57) ABSTRACT

An embodiment includes extracting a capability from a dataset representative of a project description of a proposed project using a first machine learning process to form a cluster representative of the capability. The embodiment assigns the capability to a first node of a business operations graph based on a classification result of the capability by a second machine learning process. The embodiment generates a visual indicator based, at least in part, on the assigning of the capability to the first node. The embodiment generates the visual indicator by a process comprising generating a first visual indicator of the capability being assigned to the first node, and a second visual indicator of a development sequence for the capability relative to another capability from the project description based at least in part on an association from the business operations graph between the first node and a second node of the graph.

19 Claims, 10 Drawing Sheets

(51) Int. Cl.
*G06N 20/00* (2019.01)
*G06N 5/04* (2023.01)
*G06F 40/279* (2020.01)

(56) References Cited

U.S. PATENT DOCUMENTS

| | | | | |
|---|---|---|---|---|
| 2006/0031217 | A1* | 2/2006 | Smith | G06V 20/40 |
| | | | | 707/999.005 |
| 2008/0178164 | A1* | 7/2008 | Brown | G06Q 10/10 |
| | | | | 717/144 |
| 2011/0137921 | A1* | 6/2011 | Inagaki | G06F 16/3347 |
| | | | | 707/E17.061 |
| 2012/0062574 | A1* | 3/2012 | Dhoolia | G06V 30/422 |
| | | | | 345/506 |
| 2016/0179923 | A1* | 6/2016 | Chehreghani | G06F 16/355 |
| | | | | 707/637 |
| 2016/0299884 | A1 | 10/2016 | Chioasca et al. | |
| 2018/0075368 | A1* | 3/2018 | Brennan | G06N 5/022 |
| 2018/0089543 | A1* | 3/2018 | Merler | G06V 20/35 |
| 2018/0114162 | A1 | 4/2018 | Rana et al. | |
| 2018/0129734 | A1* | 5/2018 | Iwama | G06F 16/2457 |
| 2018/0232443 | A1* | 8/2018 | Delgo | G06F 40/295 |
| 2018/0285770 | A1* | 10/2018 | Manikonda | G06N 7/005 |
| 2019/0087731 | A1* | 3/2019 | Hull | G06Q 10/067 |
| 2020/0265218 | A1* | 8/2020 | Dai | G06V 10/764 |
| 2021/0056434 | A1* | 2/2021 | Raghunathan | G06N 20/20 |

OTHER PUBLICATIONS

Cimiano, Philipp, Andreas Hotho, and Steffen Staab. "Learning concept hierarchies from text corpora using formal concept analysis." Journal of artificial intelligence research 24 (2005): 305-339 (Year: 2005).*

S. Garg, I. V. Ramakrishnan and K. Mueller, "A visual analytics approach to model learning," 2010 IEEE Symposium on Visual Analytics Science and Technology, 2010, pp. 67-74, doi: 10.1109/VAST.2010.5652484. (Year: 2010).*

Ozcan, S., Sakar, C. O., & Suloglu, M. (2020). Human resources mining for examination of R&D progress and requirements. IEEE Transactions on Engineering Management, 0, 0. [0], https://doi.org/10.1109/TEM.2020.2995538 (Year: 2020).*

Chen, Yihua, et al. "Similarity-based classification: Concepts and algorithms." Journal of Machine Learning Research 10.3 (2009). (Year: 2009).*

M. Kudo, T. Nogayama, A. Ishida and M. Abe, "Business Process Analysis and Real-world Application Scenarios," 2013 International Conference on Signal-Image Technology & Internet-Based Systems, Kyoto, Japan, 2013, pp. 983-989, doi: 10.1109/SITIS.2013.159. (Year: 2013).*

Wielewski, Automating project management with deep learning, Towards Data Science, Jan. 17, 2019, https://towardsdatascience.com/automating-project-management-with-deep-learning-bd5b851235eb.

* cited by examiner

COGNITIVE ANALYSIS OF A PROJECT DESCRIPTION

BACKGROUND

The present invention relates generally to a method, system, and computer program product for project planning. More particularly, the present invention relates to a method, system, and computer program product for cognitive analysis of a project description.

In today's technological climate, many industries are rapidly evolving and expanding and new technologies are constantly being developed and introduced. These technologies create opportunities to develop services of value to customers. The pace at which these technologies are being introduced means that service providers aim to quickly respond and adapt to meet customer requirements.

Typically, service providers introduce new or updated services on a project-by-project basis. When a service provider seeks to begin a new project, they often enlist the services of individuals referred to as subject matter experts (SMEs) who have extensive industry knowledge to plan the project. Project planning includes such tasks as determining business functions involved in the project and estimating various aspects of a proposed project, such as time and effort involved. This has traditionally been a largely manual process involving considerable time and effort involving an SME as well as consultants, specialists, and decision makers.

SUMMARY

The illustrative embodiments provide for cognitive analysis of a project description. An embodiment includes extracting a capability from a dataset representative of a project description of a proposed project using a first machine learning process to form a cluster representative of the capability. The embodiment also includes assigning the capability to a first node of a business operations graph based on a classification result of the capability by a second machine learning process. The embodiment also includes generating a visual indicator based, at least in part, on the assigning of the capability to the first node, where the generating of the visual indicator comprises generating a first visual indicator of the capability being assigned to the first node and a second visual indicator of a development sequence for the capability relative to another capability from the project description based at least in part on an association from the business operations graph between the first node and a second node of the business operations graph. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
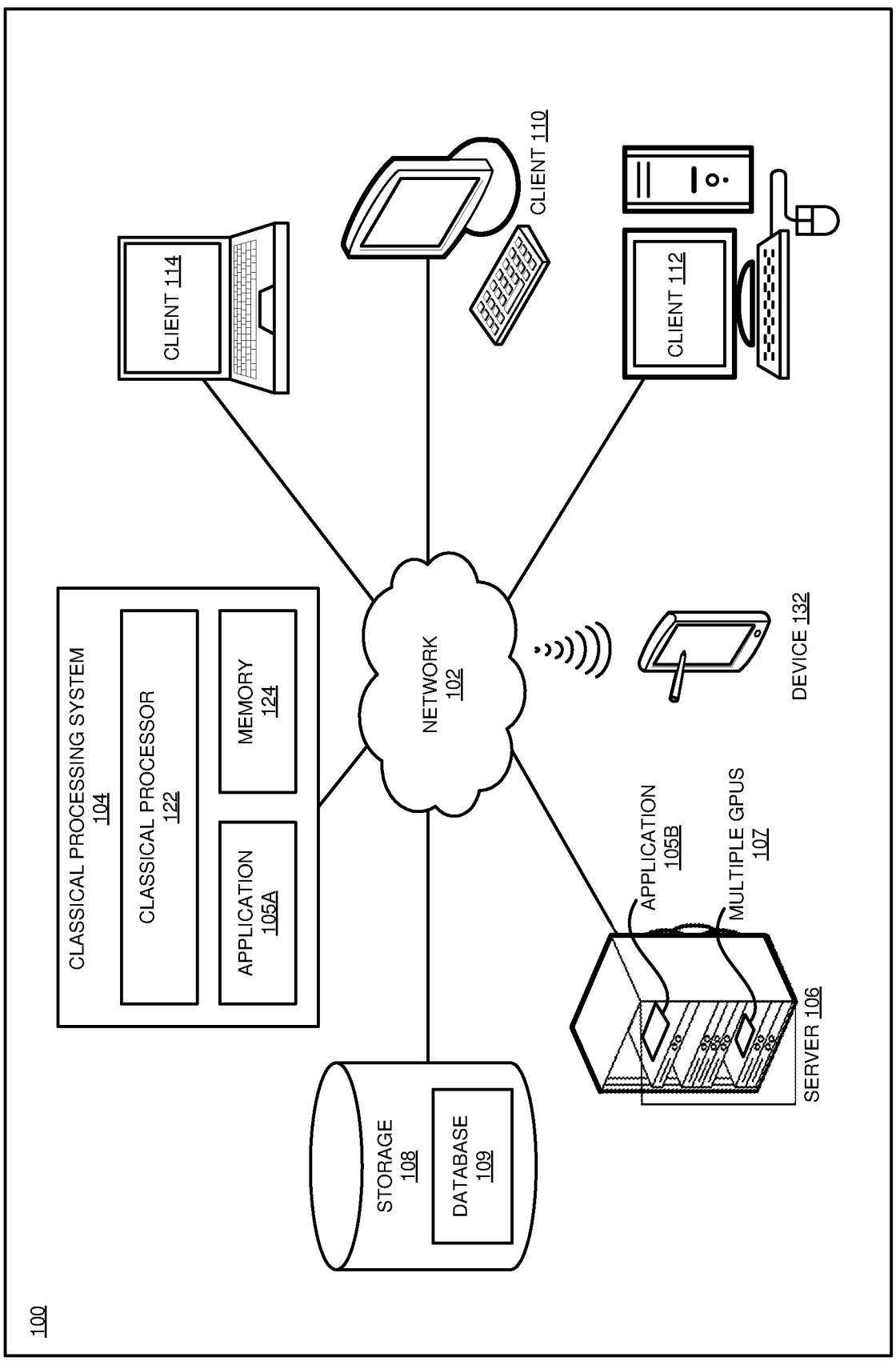
FIG. 1 depicts a block diagram of a network of data processing systems in which illustrative embodiments may be implemented.

Large Enterprises with complex distributed environments often struggle to define the most optimal way to execute complex projects that will require code changes to many different systems, service layers, communication channels, and interfaces. One reason is that there is often a complex dependency chain among systems and the business functions they perform. A new project may invoke a subset of those applications that is used as part of a long-running workflow.

Typically, product owners rely on the experience of SMEs to derive the most optimal way to execute such a project. However, the development process can be complicated and time consuming and often requires collaboration between experts from various different groups or departments to properly address the details required in the development of new products and services. Moreover, in most industries, there are various standards, requirements, and protocols that are constantly evolving, requiring additional skilled individuals that can contribute knowledge in such areas. However, finding individuals with the desired experience and expertise is not always possible, which can result in projects that are poorly planned. This ultimately impacts the project return on investment (ROI) due to sub-optimal project development.

Another challenge involves predicting business requirements, capabilities, and costs associated with a proposed project. Typically, an SME relies on experience and resource estimating tools. A variety of software applications are available to assist with cost estimation, but they do not provide any assistance with identifying business capability requirements. Also, such software applications are only accurate if the SME accuracy identifies business capability requirements. As a result, the cost accuracy is affected by the SME's subjective assessment and prediction of various aspects of a project. The cost estimating tools then use these predicted values to create an estimate for the software project. Thus, while such cost estimating tools can be helpful, they are affected by the accuracy of the subjective predictions that users provide.

The illustrative embodiments recognize project planning can be improved by providing an improved process of deriving a set of capabilities involved in a project. In some embodiments, a process of deriving a set of capabilities involved in a project includes determining an order in which the capabilities logically stack—i.e., the optimal order in which the capabilities should be designed, developed, tested, and/or implemented. In some embodiments, the process utilizes an industry domain corpus that describes the behavior of products and services typical to that industry. In some embodiments, the process analyzes various project-definition resources that define the project, such as project scope documents, business-level project requirements, and high-level project architecture documents, collectively referred to herein as a "project description" for the sake of convenience and clarity. In some embodiments, the process correlates the results of the analysis of the project description with the industry domain corpus to derive business capabilities and associated order of implementation. This information can then be provided to an SME for project planning purposes, and thereby reduces subjectivity and human error in the project planning process.

Some embodiments apply artificial intelligence methods to a natural language project description as part of a process of deriving a set of capabilities involved in a project. Some embodiments apply artificial intelligence methods to a natural language project description to examine the project description in order to detect business functions described therein. In some such embodiments, the project description comprises or is extracted from one or more various documents that collectively form at least a portion of the project description. Some embodiments also apply artificial intelligence methods to a natural language project description to derive one or more clusters of business functions. Some such embodiments apply artificial intelligence methods to associate the derived clusters with business operations described in an industry domain corpus. Some such embodiments generate a visual representation of project capabilities based on the associated clusters and business operations. Some such embodiments generate a visual representation of project capabilities and an order in which they should be planned—including an order in which they should be designed, developed, tested, and/or implemented—based on the associated clusters and business operations.

While the disclosed embodiments mention specific industries, such industries are not intended to be limiting and are provided for the sake of including examples for clarity purposes. For example, some embodiments involve one or more industries where there are complex systems involved to implement or develop a product.

In some embodiments, an application performs an analysis according to a process that includes deriving some business functions from project requirements documents or the like. In some such embodiments, the application generates a semantic business graph (or fetching a previously generated semantic business graph) from a source other than the requirements documents, for example a standard domain corpus. In some such embodiments, the application overlays the derived business functions on the business graph in order to evaluate how the business functions in the requirements documents compare to a standard set of industry or corporate business functions.

In some embodiments, project requirements documents include a set of requirements in the form of requirements document(s), business process flow(s), and other forms of unstructured data or unstructured documents that list the description or objectives aspects of a new product or of an update to an existing product. For example, in some embodiments, the requirements relate to a greenfield project, which refers to a new product that the business is planning to introduce. In some such embodiments, a business creates a single set of requirements or creates distributed requirements sets that are spread across multiple product releases. Alternatively, in some embodiments, the requirements relate to a brownfield project, which refers to some change to an existing product, such as enhancing some of the features and/or adding additional features to the existing functionality. An exemplary embodiment performs an analysis of such requirements in order to determine how the requirements correspond to a predetermined taxonomy of business capabilities.

In some embodiments, the semantic business graph comprises a multi-tier business domain corpus, which may be industry or enterprise/corporate specific. Such a domain corpus provides a way for describing an enterprise's business functions using a common language. As a non-limiting example, in some embodiments an automobile manufacturer uses a domain corpus that contains business functions that are used in the manufacture, sales, and servicing of automobiles.

As another non-limiting example, in some embodiments, a telecommunications service provider uses a domain corpus that describes the sales, ordering, and provisioning of fixed line or mobile telecommunications services. In some such embodiments, a telecommunications service provider uses an industry standard framework/taxonomy, for example a business process framework such as Enhanced Telecom Operations Map (eTOM), a systems integration framework such as Technology Neutral Architecture (TNA), an information framework such as Shared Information and Data Model (SID), and/or an application framework such as Telecom Application MAP (TAM), which are parts of a comprehensive framework of development provided by the TeleManagement Forum (TM Forum) New Generation Operations Systems and Software (NGOSS) initiative (eTOM, NGOSS, and TM Forum are trademarks of TM FORUM, Formerly Telemanagement Forum, of Parsippany, N.J., in the United States). In some such embodiments, a telecommunications service provider uses an industry standard taxonomy to form the basis of their corpus, or as a source from which they derive a variant thereof to fit their business more closely.

In some embodiments, the source for the business domain corpus for a greenfield project includes a domain corpus is created using industry standard frameworks. In some embodiments, the source for the business domain corpus for a brownfield project includes a domain corpus is created using test cases and/or steps based on End-to-End (E2E) testing-based business process models. In some embodiments, the source for the business domain corpus includes manually inputted operations and sequences, for example by an SME or other experienced personnel.

In some embodiments, the semantic business graph includes a multi-tier taxonomy that describes industry or corporate business functions in hierarchical format that has two or more tiers that include function trees of increasingly or decreasingly specific business functions, for example:

Sales→Contracting→Generate contract from standard template
Billing→Invoice Generation→Calculate Fees A multi-tier-based taxonomy allows for varying levels of granularity in grouping information. For example, in some embodiments, each "most-granular" or top-level element in the corpus represents a business operation or business function, which, for example, in some embodiments may be associated with respective divisions of a company, such as accounting, engineering, manufacturing, and administrative divisions. By annotating the business functions with relationships among each other (representing logical cause and effect in the form of "when Business Operation A is impacted, Business Operation B is automatically also impacted"), the corpus represents a semantic business operations graph. The logical implication is that if a project affects a certain business operation, that another business operation will more than likely also be impacted. Here, in some embodiments, an application examines test case steps, existing process models, and/or subject matter expertise as part of a process of deriving the semantic business graph.

Note that in some embodiments the logical cause and effect associations among business operations span cross-domains and have one or more business rules assigned to them. In some embodiments, a business rule indicated under which condition the association holds or does not hold. For example, if a new service feature is added to an existing product/service line, billing systems will typically need to assign a billing identifier to the new feature/component. The two business operations will thus be logically connected.

In some embodiments, a project description analysis application derives some business functions, also referred to generally as capabilities, from natural-language based project description data that includes project requirements data from one or more project requirements documents or the like. In some such embodiments, the application generates a multi-tier semantic business graph (or fetching a previously-generated multi-tier semantic business graph) from a source other than the requirements documents, for example a standard business domain corpus.

Some embodiments comprise higher level natural language processing capabilities such as inferencing and deep semantic processing. For example, some embodiments comprise a natural language classifier (NLC) that includes a machine-learning component that is trained based on the business domain corpus and then used to identify terminology in the project description data related to business functions in the business graph. In some embodiments, the project description analysis application parses the project description data via one or more of a slot grammar parser, a predicate-argument structure (PAS) builder, and higher level natural language processing capabilities to parse out insignificant language (e.g., articles, conjunctions, auxiliary verbs, pronouns, and prepositions). In some embodiments, upon parsing the project description data, the NLC identifies one or more terms or entities from the project description data corresponding to one or more business functions from the business graph.

For example, in some embodiments the project description includes text containing mentions of one or more strings of text that include references to concepts that have some degree of association with concepts contained in the business graph. In some embodiments, the NLC estimates the relation between any two such concepts using various techniques for estimating how close a specific concept is to another, for example by calculating confidence scores representative of degrees of similarity of strings of text contained in the two concepts. As a non-limiting example, some embodiments compute a likelihood vector for each concept in the project description data that indicates how likely it is that the given concept is related one or more concepts in the business graph.

Some embodiments also apply artificial intelligence methods to the project description data to derive one or more clusters of business functions. For example, in some such embodiments, a project description analysis application comprises a project capability clustering system that clusters business functions from the project description data to generate the capability clusters. In some such embodiments, the project capability clustering system uses a likelihood vector from the NLC as a feature vector for a clustering algorithm (for example k-means) employed to cluster the concepts into groups. For example, in some such embodiments, the project capability clustering system separates concepts into distinct groups based at least in part on their conceptual closeness related to respective terms representative of business functions in the business graph. In some embodiments, the project capability clustering system further forms one or more sub-clusters based on terms in the project description data that are divisible into identifiable groups associated with sub-concepts of the business function of the parent cluster.

In some embodiments, a project description analysis application applies artificial intelligence methods to associate the derived clusters with business operations described in an industry domain corpus. For example, in some embodiments, the project description analysis application overlays the derived one or more clusters of business functions on the business graph in order to evaluate how the business functions in the requirements documents compare to a standard set of industry or corporate business functions. For example, in some embodiments, the project description analysis application treats each cluster as a capability and assigns the cluster capability to a node of the business operations graph. In some embodiments, the project description analysis application applies a machine learning classification process to each capability cluster to identify a respective associated node, and then assigns the capability cluster to the associated node.

In some embodiments, the machine learning classification process uses a Naive-Bayes algorithm to assign each cluster capability to a node of the business operations graph. In some such embodiments, each node is treated as a classifier label for the node's function, each cluster is treated as a union of variables x, y, z, and a probability $P(xyz|Ci)$ is obtained for all classifier C labels i=1 to k. Each cluster is assigned to a node corresponding with the label with highest probability. In some embodiments, if there are equal or almost equal (e.g., within 5%) probabilities for more than one label, probabilities are calculated for one or more classifiers on the next level of the business graph hierarchy and the cluster is assigned based on the one or more probabilities of those levels. In some embodiments, if the probability values indicate outlier values, the cluster is discarded. In some embodiments, more than one cluster can be assigned to a node if the node has a highest probability for the assigned clusters.

In some embodiments, once each of the clusters has been classified and either discarded or assigned to a node, the key terms from each cluster are associated in an array based on associations between the respective assigned nodes of the business graph. In some embodiments, the associations between the labels are used to determine how the corresponding capabilities should logically be stacked or scheduled to accomplish optimal project execution.

Some such embodiments generate a visual representation of project capabilities based on the associated clusters and business operations. Some such embodiments generate a visual representation of project capabilities and an order in which they should be planned—including an order in which they should be designed, developed, tested, and/or implemented—based on the associated clusters and business operations.

In an illustrative non-limiting example, the project requirements for a Telco project are as follows:
1. Whenever there is an issue with the broadband service, the customer can login to portal and can enter the customer ID
2. Based on the customer ID, the customer and his circuit related information is retrieved from the inventory
3. Whenever customer logs in to portal, the user should be able to see all his pending tickets in the home page
4. User should be able to enter the issue details and create ticket
5. User should be able to cancel any pending ticket after viewing the ticket in the home page.

A project description analysis application processes the requirements according to a process that includes the following:
a) The project description analysis application uses a clustering technique such as k-Means (non-limiting example) to group the requirements into clusters that represent capabilities that the project is asking for, where clusters group the requirements that semantically belong together. Thus, this action provides a mechanism for slicing the project into logical chunks.
b) The project description analysis application then maps the clusters to a semantic business operations graph by classifying them (using an NLC such as Naive-Bayes) into the labels previously defined with a business operations corpus.
c) The project description analysis application then overlays the project requirements on the business operations graph to provide a visual indicator of which business functions are impacted by the project, as well as their proximity to each other on the business operations graph, thus providing insight and guidance as to how the capabilities of the new project should be defined.
d) The project description analysis application also illustrates dependencies between the requirements based on relationships from the business operations graph, which provides information on how the capabilities should stack since the dependencies provide insight as to actual dependencies.

In this example, assuming that the project requirements involve enhancing existing functionality to provide more details of tickets in a customer portal, the project analysis reveals business operations that are impacted, such as View Tickets and Login routines. Overlaying this information then on top of the semantic business operations graph will, for example, reveal that View Tickets routine depends on (uses) portal access. Logically then, the portal access capability should be developed before the View Tickets routine. This is logical as the portal will need to define what new information needs to be placed on the screen, and that will drive design changes to the ticketing system's outbound interface.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments.

Additional or different advantages may be realized by specific illustrative embodiments. Furthermore, a particular illustrative embodiment may have some, all, or none of the advantages listed above.

Figure 2:
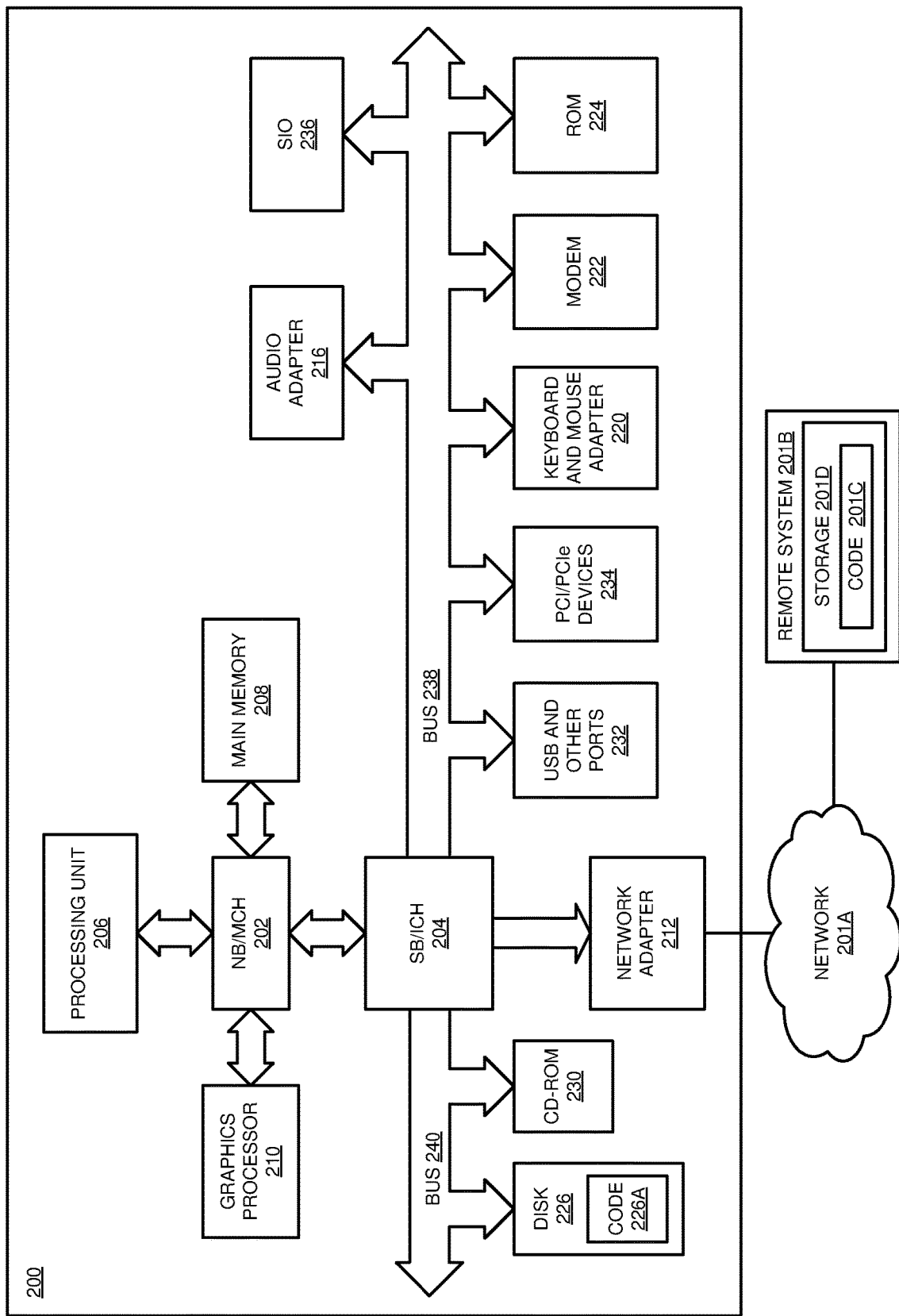
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Data processing system 104 couples to network 102. Software applications may execute on any data processing system in data processing environment 100. Any software application described as executing in processing system 104 in FIG. 1 can be configured to execute in another data processing system in a similar manner. Any data or information stored or produced in data processing system 104 in FIG. 1 can be configured to be stored or produced in another data processing system in a similar manner. A data processing system, such as data processing system 104, may contain data and may have software applications or software tools executing computing processes thereon. In an embodiment, data processing system 104 includes memory 124, which includes application 105A that may be configured to implement one or more of the data processor functions described herein in accordance with one or more embodiments.

Server 106 couples to network 102 along with storage unit 108. Storage unit 108 includes a database 109 configured to store data as described herein with respect to various embodiments, for example image data and attribute data. Server 106 is a conventional data processing system. In an embodiment, server 106 includes application 105B that may be configured to implement one or more of the processor functions described herein in accordance with one or more embodiments.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment of a network that includes a client/server implementation of an application that provides cognitive analysis of a project description. For example, server 106, and clients 110, 112, 114, are depicted as servers and clients only as example and not to imply a limitation to a client-server architecture. As another example, a distributed embodiment of an application that provides cognitive analysis of a project description can be distributed across several data processing systems, and a data network as shown, whereas another embodiment of an application that provides cognitive analysis of a project description can be implemented on a single data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. In an embodiment, device 132 sends requests to server 106 to perform one or more data processing tasks by application 105B such as initiating processes described herein that provide cognitive analysis of project descriptions. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, data processing system 104, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as data processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
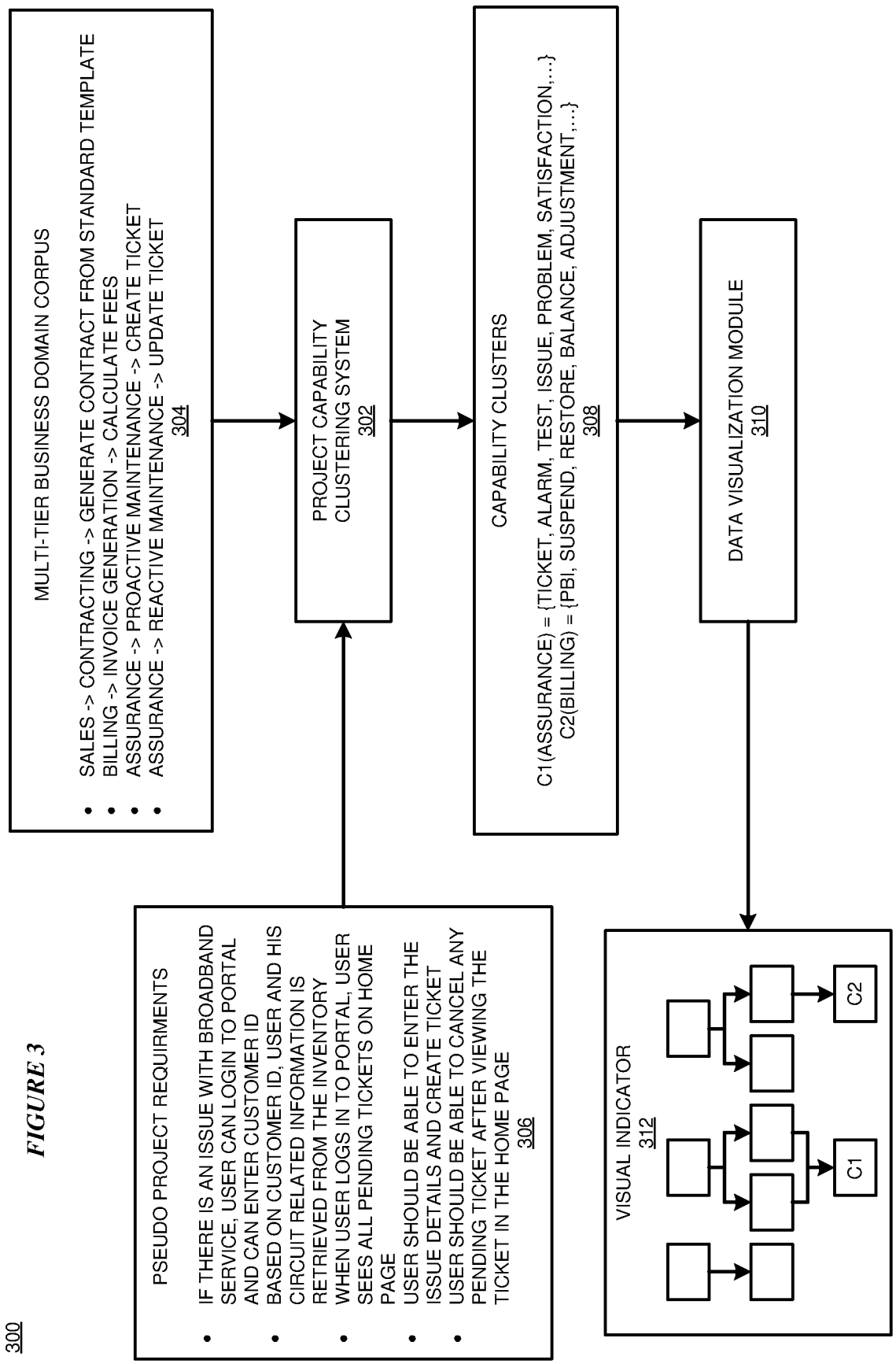
FIG. 3 depicts a block diagram of an example project description analysis application in accordance with an illustrative embodiment.

With reference to FIG. 3, this figure depicts a block diagram of an example project description analysis application 300 in accordance with an illustrative embodiment. In a particular embodiment, the example application 300 is an example of applications 105A/105B of FIG. 1.

In the illustrated embodiment, the project description analysis application 300 comprises a project capability clustering system 302 that receives input data, such as multi-tier business domain corpus 304 and pseudo project requirements 306, and outputs capability clusters 308 to a data visualization module 310, which in turn outputs a visual indicator 312 as described herein. In some embodiments, the functionality described herein is distributed among a plurality of systems, which can include combinations of software and/or hardware-based systems, for example Application-Specific Integrated Circuits (ASICs), computer programs, or smart phone applications. For example, in alternative embodiments, multi-tier business domain corpus 304 and pseudo project requirements 306 are stored in one or more databases that are on a server with project capability clustering system 302 or are located on one or more other computing devices that are in communication with a server hosting the project capability clustering system 302 via a network.

In the illustrated embodiment, project capability clustering system 302 performs an analysis according to a process that includes deriving business functions from pseudo project requirements 306. In the illustrated embodiment, the project capability clustering system 302 generates capability clusters 308 based on the derived business functions from the pseudo project requirements 306. The data visualization module 310 then overlays the derived business functions on the business graph in order to generate visual indicator 312. In some embodiments, visual indicator 312 provides a visual indicator of a relationship between the multi-tier business domain corpus 304 and the pseudo project requirements 306.

In the illustrated embodiment, the multi-tier business domain corpus 304 and pseudo project requirements 306 include non-limiting examples for clarity purposes. In the illustrated embodiment, the multi-tier business domain corpus 304 comprises a multi-tier business domain corpus that is an industry-specific multi-tier taxonomy of business functions.

Figure 5:
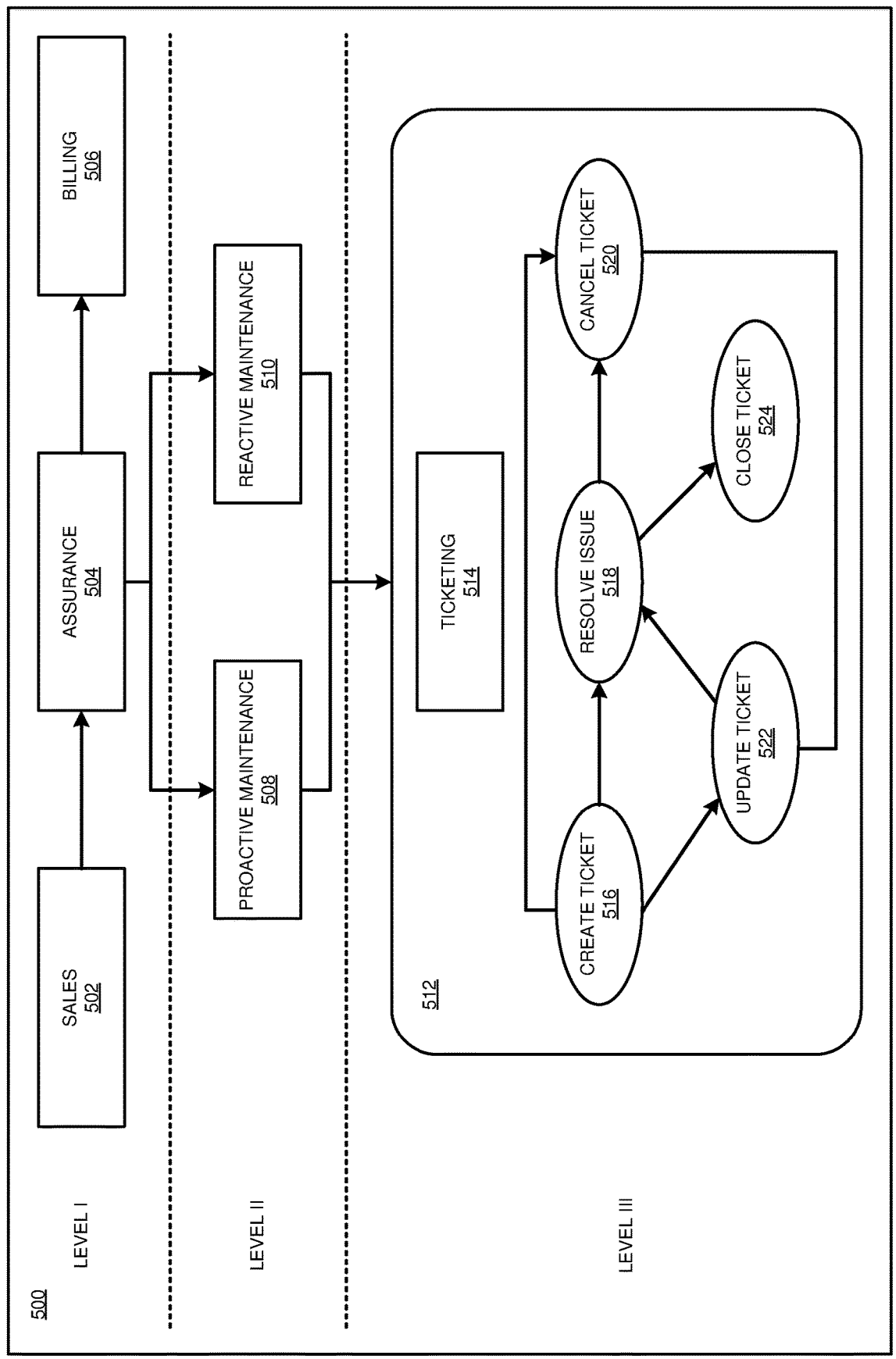
FIG. 5 depicts a block diagram of an example multi-tier taxonomy in accordance with illustrative embodiments.

With reference to FIG. 5, this figure depicts a block diagram of an example multi-tier taxonomy 500 in accordance with an illustrative embodiment. In a particular embodiment, the example multi-tier taxonomy 500 is an example of a multi-tier taxonomy for the multi-tier business domain corpus 304 of FIG. 3.

In some embodiments, the multi-tier taxonomy 500 includes three tiers labeled Level I, Level II, and Level III. Level I corresponds to the highest-level capabilities: Fulfillment 502, Assurance 504, and Billing 506. Within the Assurance 504 capability tree there are two Level II capabilities: Proactive Maintenance capability 508 and Reactive Maintenance capability 510. Within the Assurance 504 capability tree there is a Level III capability: ticketing 514 capability. The multi-tier taxonomy 500 also includes a cluster 512 of elements 516-524 derived from project requirements such as pseudo project requirements 306 in FIG. 3 that are all related to ticketing. The elements of cluster 512 include Create Ticket 516, Resolve Issue 518, Cancel Ticket 520, Update Ticket 522, and Close Ticket 524. In some embodiments, elements 516-524 are capabilities from a former project that have been added to the multi-tier taxonomy 500, for example as prior project dataset 424 added by taxonomy update module 426 to taxonomy data 406 in FIG. 4 as described below. and Update Ticket. Implementations of the multi-tier business domain corpus 304 may have many more industry-related or business-related capabilities that are included in the corpus or taxonomy that are organized such that there are many more capabilities at each level, and additional levels. In some embodiments, the multi-tier business domain corpus 304 may need to be updated when and if required as business functions change over time.

Referring again to FIG. 3, in the illustrated embodiment, the pseudo project requirements 306 includes a set of requirements in the form of unstructured data that describes aspects of a new product or of an update to an existing product:
 1. If there is an issue with broadband service, user can login to Portal and can enter customer ID.
 2. Based on customer ID, user and circuit related information is retrieved from inventory.
 3. When user logs in to Portal, user sees all pending tickets on home page.
 4. User should be able to enter the issue details and create ticket.
 5. User should be able to cancel any pending ticket after viewing ticket in home page.

Implementations of the pseudo project requirements 306 may include a much longer list of product requirements that may be presented in any of many different ways and are often provided in a natural-language format of unstructured data.

In some embodiments, the project capability clustering system 302 classifies and clusters business functions from the pseudo project requirements 306 to generate the capability clusters 308. For example, in some embodiments, project capability clustering system 302 includes a natural language classifier (NLC) and a machine-learning clustering module that examine the project requirements in order to detect business functions described in the pseudo project requirements 306. In some embodiments, the NLC comprises a machine-learning component that is trained based on the multi-tier business domain corpus 304 and then used to identify terminology in the pseudo project requirements 306 that may be related to business functions in the multi-tier business domain corpus 304.

In some embodiments, the machine-learning clustering module comprises an unsupervised machine learning classifier In the illustrated embodiment, examples of clusters are shown as clusters C1 and C2, where cluster C1 includes terms related to the Assurance capability (ticket, alarm, test, issue, problem, satisfaction) and cluster C2 includes terms related to billing (Product Billing Indicator (PBI), suspend, restore, balance, adjustment).

In some embodiments, the data visualization module 310 overlays clusters C1 and C2 of the capability clusters 308 on a multi-tier taxonomy from the multi-tier business domain corpus 304 to provide a visual indicator 312 of which business functions of the multi-tier business domain corpus 304 are impacted by the pseudo project requirements 306. In some embodiments, the visual indicator 312 also indicates dependencies between capabilities from the pseudo project requirements 306 based on relationships from the multi-tier business domain corpus 304, which provides information on how the capabilities should stack, indicating the optimal order of development.

Figure 4:
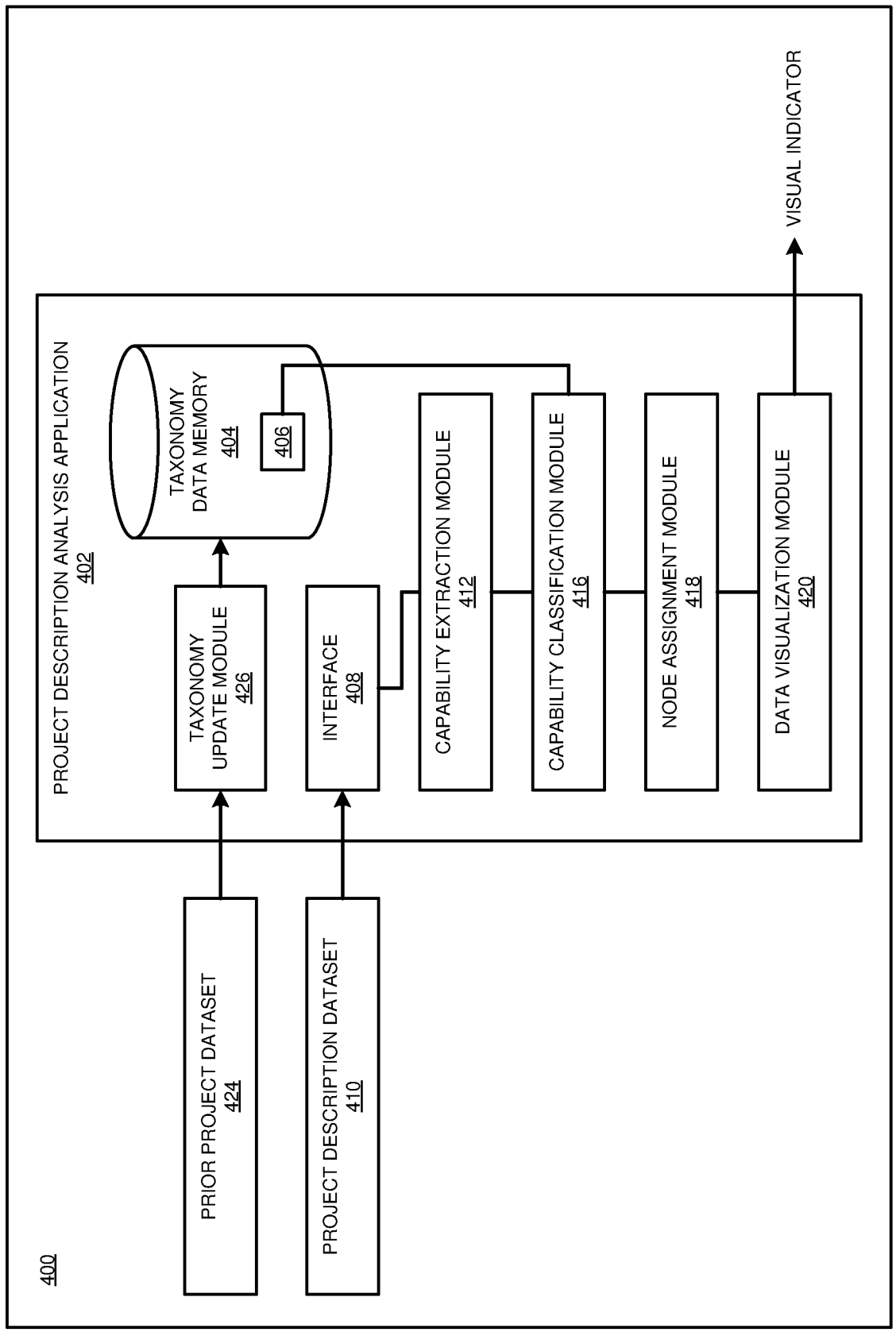
FIG. 4 depicts a block diagram of an example project description analysis application in accordance with illustrative embodiments.

With reference to FIG. 4, this figure depicts a block diagram 400 of an example project description analysis application 402 in accordance with an illustrative embodiment. In a particular embodiment, the project description analysis application 402 is an example of applications 105A/105B of FIG. 1.

In the illustrated embodiment, the project description analysis application 402 comprises a taxonomy update module 426, an interface 408, a capability extraction module 412, a capability classification module 416, a node assignment module 418, a data visualization module 420, and taxonomy data memory 404 that stores taxonomy data 406. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, interface 408 receives project description dataset 410. In some embodiments, the project description dataset 410 comprises a set of requirements in the form of requirements document(s), business process flow(s), and other forms of unstructured data or unstructured documents that list the description or objectives aspects of a new product or of an update to an existing product. In some embodiments, the interface 408 includes a graphical or command line interface that allows a user to input the project description dataset 410. In some embodiments, the interface 408 comprises an application programming interface (API) that defines interactions that allow another processor-based system to electronically transmit a project description dataset 410 to the project description analysis application 402.

The interface 408 transmits the project description dataset 410 to capability extraction module 412. In some embodiments, the capability extraction module 412 comprises a natural language classifier (NLC) that includes a machine-learning component that is trained based on a business domain corpus stored with an associated business graph or taxonomy in taxonomy data memory 404. The NLC identifies terminology in the project description dataset 410 related to business functions in the business graph. In some embodiments, the capability extraction module 412 parses the project description dataset 410 via one or more of a slot grammar parser, a predicate-argument structure (PAS) builder, and higher level natural language processing capabilities to parse out insignificant language (e.g., articles, conjunctions, auxiliary verbs, pronouns, and prepositions). In some embodiments, upon parsing the project description data, the NLC identifies one or more terms or entities from the project description data corresponding to one or more business functions from the stores taxonomy data 406. The capability extraction module 412 then transmits the identified terms to the capability classification module 416.

In some embodiments, capability classification module 416 applies artificial intelligence methods to the identified terms from the capability extraction module 412 to derive one or more clusters of business functions. For example, in some such embodiments, the capability classification module 416 clusters the identified terms to generate the capability clusters. In some such embodiments, the capability classification module 416 uses a likelihood vector from the NLC as a feature vector for a clustering algorithm (for example k-means) employed to cluster the terms into groups. In some embodiments, the capability classification module 416 further forms one or more sub-clusters based on identified terms that are divisible into identifiable groups associated with sub-concepts of the taxonomy data 406. The capability classification module 416 then transmits the clusters to the node assignment module 418.

In some embodiments, the node assignment module 418 applies artificial intelligence methods to associate the derived clusters with business operations described in the taxonomy data 406. For example, in some embodiments, the node assignment module 418 overlays the derived clusters on the business graph in order to evaluate how the business functions in the requirements documents compare to a standard set of industry or corporate business functions. For example, in some embodiments, the node assignment module 418 treats each cluster as a capability and assigns the cluster capability to a node of the taxonomy data 406. In some embodiments, the taxonomy data 406 applies a machine learning classification process to each capability cluster to identify a respective associated node, and then assigns the capability cluster to the associated node.

In some embodiments, the node assignment module 418 uses a Naive-Bayes algorithm to assign each cluster capability to a node of the taxonomy data 406. In some such embodiments, the node assignment module 418 treats each node as a classifier label for the node's function, each cluster as a union of variables x, y, z, and obtains a probability $P(xyz|Ci)$ for all classifier C labels i=1 to k. In some embodiments, the node assignment module 418 assigns each cluster to a node corresponding with the label with the highest probability. In some embodiments, if there are equal or almost equal (e.g., within 5%) probabilities for more than one label, the node assignment module 418 calculates probabilities for one or more classifiers on the next level of the business graph hierarchy and assigns the cluster based on the one or more probabilities of those levels. In some embodiments, if the probability values indicate outlier values, the node assignment module 418 discards the cluster. In some embodiments, the node assignment module 418 assigns more than one cluster to a node if the node has a highest probability for each of the one or more clusters. The node assignment module 418 then transmits the assigned cluster data to the data visualization module 420.

In some embodiments, the data visualization module 420 overlays the clusters to their respective assigned nodes on a graphical representation of the taxonomy data 406 and overlaid clusters. In some embodiments, the data visualization module 420 uses the associations between the nodes of the taxonomy data 406 to generate graphical representations of the optimal order in which the corresponding capabilities should be developed. The data visualization module 420 then outputs the graphical representation as a visual indicator of project capabilities and an order in which they should be planned. In some embodiments, the data visualization module 420 outputs the visual indicator as an electronic computer file in any of various formats, such as an image format, document format, or presentation format.

In some embodiments, the taxonomy data 406 includes prior project dataset 424 that is received via the taxonomy update module 426. In some embodiments, the taxonomy update module 426 includes a graphical or command line interface that allows a user to input the prior project dataset 424. In some embodiments, the taxonomy update module 426 comprises an application programming interface (API)

that defines interactions that allow another processor-based system to electronically transmit a prior project dataset 424 to the project description analysis application 402. In some embodiments, the results of the clustering and node assignment are input as prior project dataset 424 to improve the taxonomy data 406 with additional data for future related projects.

Figure 6:
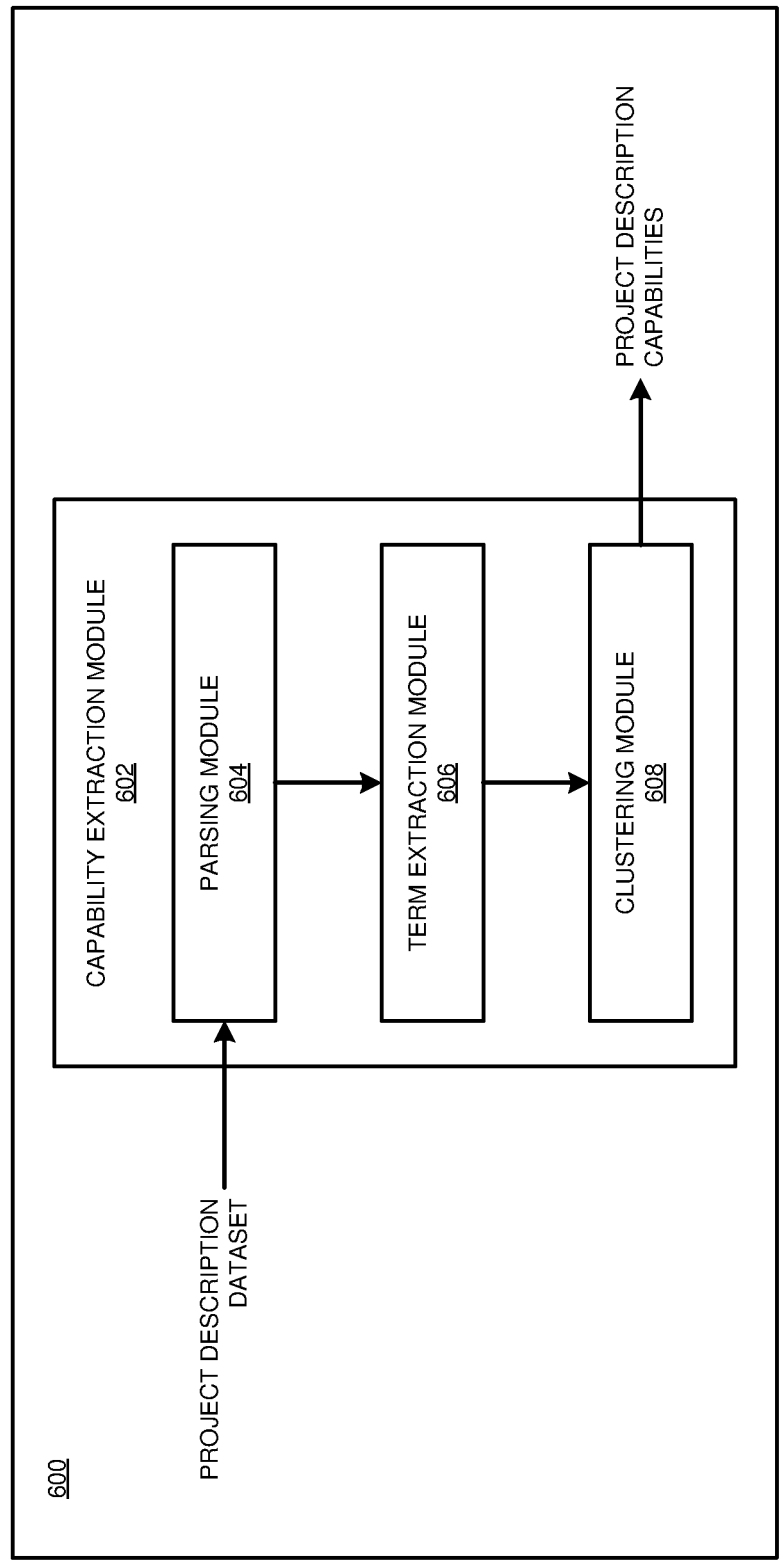
FIG. 6 depicts a more detailed block diagram of an example capability extraction module in accordance with an illustrative embodiment.

With reference to FIG. 6, this figure depicts a block diagram 600 of an example capability extraction module 602 in accordance with an illustrative embodiment. In a particular embodiment, the example capability extraction module 602 is an example of a capability extraction module 412 combined with the capability classification module 416 of FIG. 4.

In some embodiments, the capability extraction module 602 includes a parsing module 604, a term extraction module 606, and a clustering module 608. In some embodiments, the functionality described herein is distributed among a plurality of systems, which can include combinations of software and/or hardware-based systems, for example Application-Specific Integrated Circuits (ASICs), computer programs, or smart phone applications.

In some embodiments, the parsing module 604 receives a project description dataset. In some embodiments, the parsing module 604 parses the project description dataset via one or more of a slot grammar parser, a predicate-argument structure (PAS) builder, and higher level natural language processing capabilities to parse out insignificant language (e.g., articles, conjunctions, auxiliary verbs, pronouns, and prepositions). In some embodiments, upon parsing the project description data, the parsing module 604 provides the parsed data to the image classifier module 606.

In some embodiments, the image classifier module 606 includes an NLC that identifies one or more terms or entities from the project description data corresponding to one or more business functions. for example, from the stores taxonomy data 406 of FIG. 4. In some embodiments, the image classifier module 606 then transmits the identified terms to the clustering module 608.

In some embodiments, clustering module 608 applies artificial intelligence methods to the identified terms from the image classifier module 606 to derive one or more clusters of business functions. For example, in some such embodiments, the clustering module 608 clusters the identified terms to generate the capability clusters. In some such embodiments, the clustering module 608 uses a likelihood vector from the image classifier module 606 as a feature vector for a clustering algorithm (for example k-means) employed to cluster the terms into groups.

Figure 7:
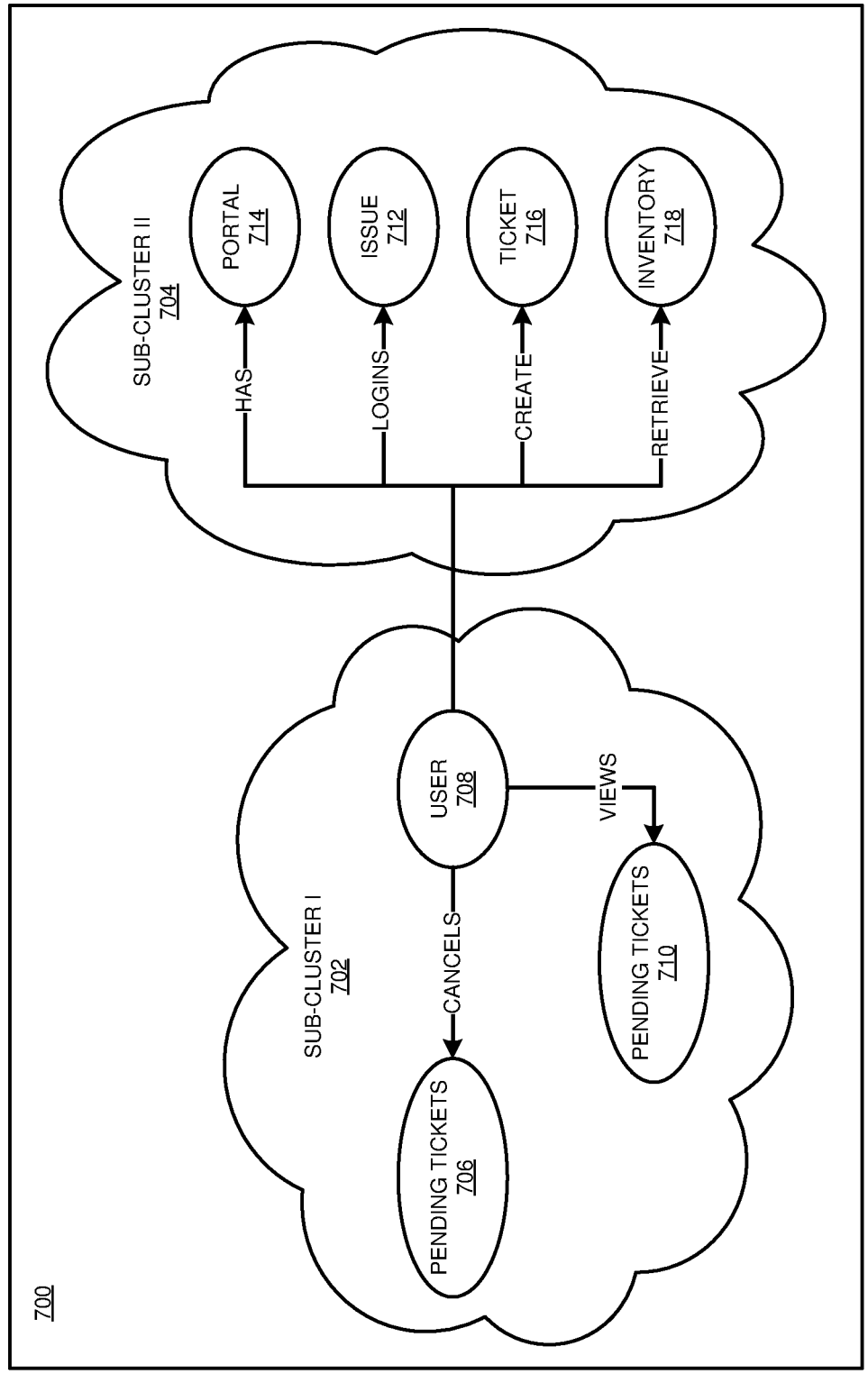
FIG. 7 depicts a block diagram of example sub-clusters in accordance with illustrative embodiments.

With reference to FIG. 7, this figure depicts a block diagram 700 of example subclusters 702 and 704 in accordance with an illustrative embodiment. In some embodiments, the clustering module 608 further forms one or more sub-clusters 702 and 704 based on identified terms that are divisible into identifiable groups associated with sub-concepts of taxonomy data, such as taxonomy data 406. For example, in the illustrated embodiment, the first sub-cluster 702 comprises capability terms for a user 708 cancels pending tickets 706 and views pending tickets 710. In this example, in the illustrated embodiment, the second sub-cluster 704 comprises capability terms for a user 708 has a portal 714, gets a login issued 712, creates a ticket 716, and retrieves inventory 718. In embodiments, if the complexity in terms of cost or function points is additionally associated with each requirement (as is typically done in user story estimation for Agile driven projects), the capabilities are further split into sub-clusters, which are different logical groups—i.e. sub-capabilities that are based on the association graph. It is up to the user to name each of the sub-cluster 702/704, where each sub-cluster would represent one capability.

Figure 8:
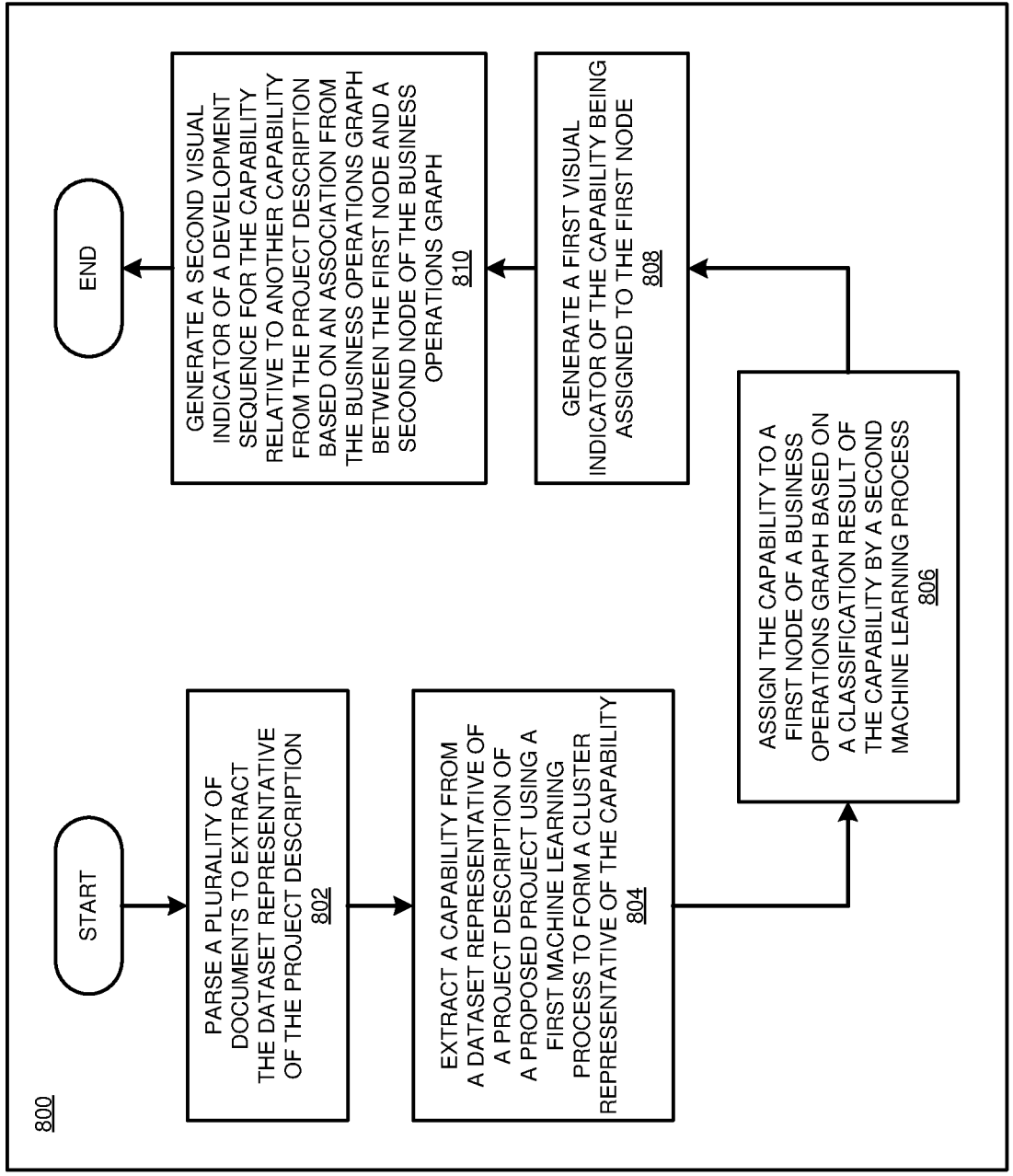
FIG. 8 depicts a flowchart of an example process for cognitive analysis of a project description in accordance with an illustrative embodiment.

With reference to FIG. 8 this figure depicts a flowchart of an example process 800 for cognitive analysis of a project description in accordance with an illustrative embodiment. In a particular embodiment, the project description analysis application 300 or project description analysis application 402 carries out the process 800.

In an embodiment, at block 802, the process parses a plurality of documents to extract the dataset representative of the project description. Next, at block 804, the process extracts a capability from a dataset representative of a project description of a proposed project using a first machine learning process to form a cluster representative of the capability. Next, at block 806, the process assigns the capability to a first node of a business operations graph based on a classification result of the capability by a second machine learning process. Next, at block 808, the process generates a visual indicator of a relationship between the business operations graph and the proposed project. Next, at block 810, the process generates a visual indicator of a development sequence for the capability relative to another capability from the project description based on an association from the business operations graph between the first node and a second node of the business operations graph.

Figure 9:
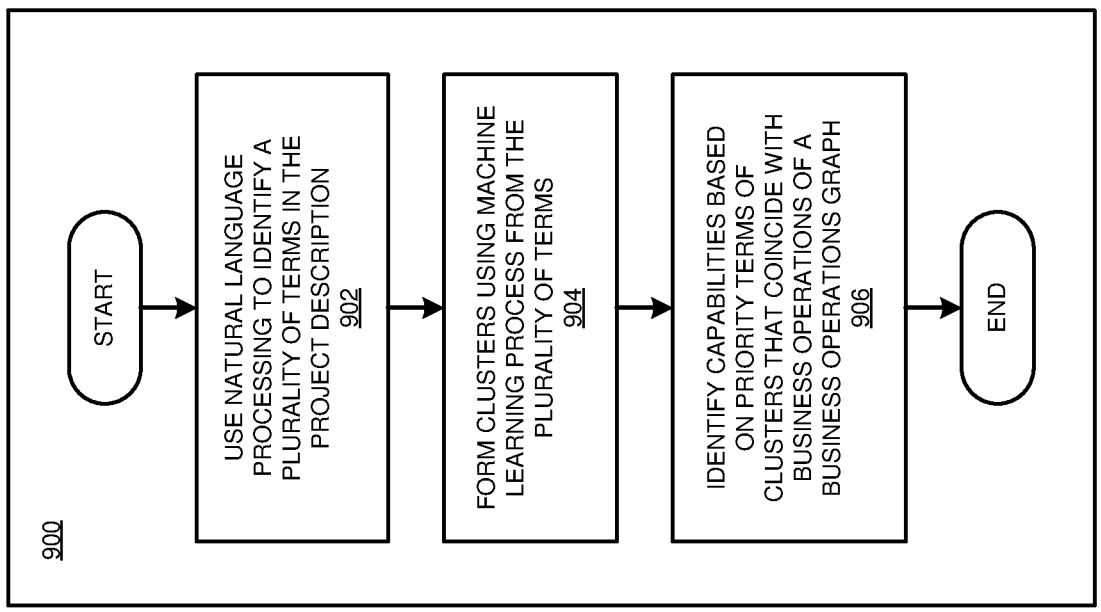
FIG. 9 depicts a flowchart of an example process for extracting a project description in accordance with an illustrative embodiment.

With reference to FIG. 9 this figure depicts a flowchart of an example process 900 for extracting a project description in accordance with an illustrative embodiment. In a particular embodiment, the project description analysis application 300 or project description analysis application 402 carries out the process 900.

In an embodiment, at block 902, the process uses natural language processing to identify a plurality of terms in the project description.

In an embodiment, at block 904, the process forms clusters using machine learning process from the plurality of terms. In an embodiment, at block 906, the process identifies capabilities based on priority terms of clusters that coincide with business operations of a business operations graph.

Figure 10:
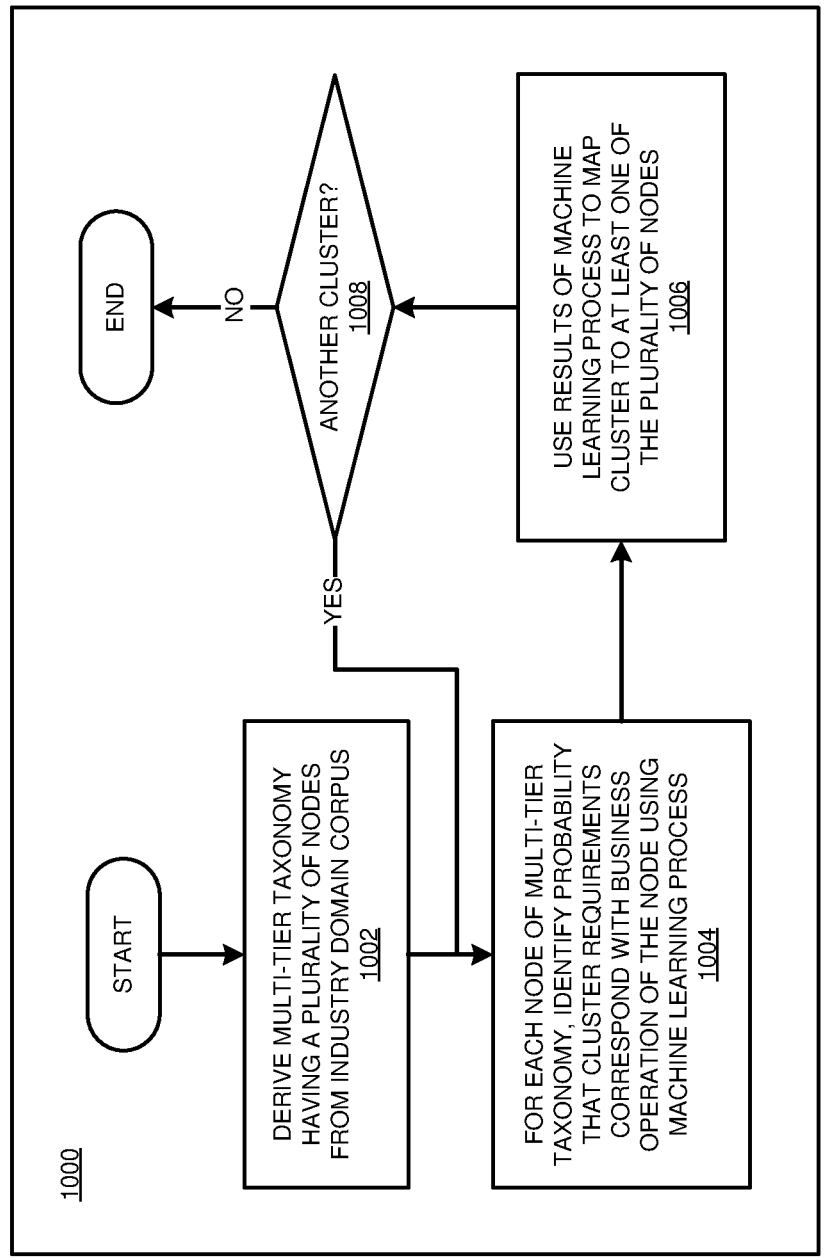
FIG. 10 depicts a flowchart of an example process for overlaying clusters on a multi-tier taxonomy in accordance with an illustrative embodiment.

With reference to FIG. 10 this figure depicts a flowchart of an example process 1000 for overlaying clusters on a multi-tier taxonomy in accordance with an illustrative embodiment. In a particular embodiment, the project description analysis application 300 or project description analysis application 402 carries out the process 1000.

In an embodiment, at block 1002, the process derives a multi-tier taxonomy having a plurality of nodes from industry domain corpus.

In an embodiment, at block 1004, the process identifies, for each node of multi-tier taxonomy, a probability that cluster requirements correspond with business operation of the node using machine learning process.

In an embodiment, at block 1006, the process uses results of machine learning process to map a cluster to at least one of the plurality of nodes.

In an embodiment, at block 1008, the process check if there is another cluster to process. If so, the process returns to block 1004. Otherwise, the process ends.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method comprising:
   training a first machine-learning classifier using a business domain corpus, wherein the first machine-learning classifier is a natural language classifier (NLC) and the training results in a trained NLC that identifies project description terminology related to capabilities in a business operations graph;
   extracting a term from a dataset representative of a project description of a proposed project;
   generating, by the trained NLC, a likelihood vector comprising a plurality of confidence scores representing degrees of similarity between the term and respective capabilities in the business operations graph;
   inputting the likelihood vector into a clustering algorithm that uses the likelihood vector as a feature vector, wherein the clustering algorithm uses k-means clustering and the feature vector to assign the term to a first cluster of a plurality of clusters, wherein the first cluster is representative of a capability from among the capabilities in the business operations graph;
   detecting equal first and second probability values for first and second nodes, respectively, of a first level of the business operations graph, wherein the first and second probability values are part of a first classification result for the capability by a second machine-learning classifier;
   assigning, responsive to detecting the equal probability values, the capability to a second-level node on a second level of the business operations graph;
   discarding, responsive to a second classification result by the second machine-learning classifier containing outlier probability values, a second cluster of the plurality of clusters, wherein the second cluster is representative of a second capability used for determining the second classification result; and generating a visual indicator based, at least in part, on the assigning of the capability to the second-level node, wherein the generating of the visual indicator comprises generating a first visual indicator of the capability being assigned to the second-level node and a second visual indicator of a development sequence for the capability relative to another capability from the project description based at least in part on an association from the business operations graph between the first node and the second-level node of the business operations graph.

2. The method of claim 1, further comprising parsing a plurality of documents to extract the dataset representative of the project description.

3. The method of claim 1, wherein the extracting of the term from the dataset further comprises using natural language processing to identify a plurality of terms in the project description.

4. The method of claim 3, further comprising:
forming the first cluster representative of the capability based at least in part on a priority term of the plurality of terms; and
classifying the capability by associating the priority term with a business operation of the business operations graph.

5. The method of claim 3, wherein the extracting of the term from the dataset further comprises forming the first cluster using the clustering algorithm to group the plurality of terms into the first cluster based on a first term of the plurality of terms.

6. The method of claim 5, further comprising forming a sub-cluster of the first cluster using the clustering algorithm based on a second term of the plurality of terms.

7. The method of claim 1, wherein the clustering algorithm is an unsupervised machine learning process.

8. The method of claim 1, wherein the first node of the business operations graph is representative of a business function of the business operations graph.

9. The method of claim 1, wherein the business operations graph comprises a multi-tier taxonomy of business functions.

10. The method of claim 9, further comprising deriving the multi-tier taxonomy from an industry domain corpus.

11. The method of claim 9, further comprising classifying the capability into a business function corresponding to the second-level node of the business operations graph.

12. The method of claim 11, wherein the generating of the visual indicator of a relationship between the business operations graph and the proposed project includes visually indicating the classification of the capability into the business function corresponding to the second-level node of the business operations graph.

13. A computer usable program product for cognitive analysis of a project description, the computer program product comprising one or more computer readable storage media, and program instructions collectively stored on the one or more computer readable storage media, the program instructions executable by a processor to cause the processor to perform operations comprising:
training a first machine-learning classifier using a business domain corpus, wherein the first machine-learning classifier is a natural language classifier (NLC) and the training results in a trained NLC that identifies project description terminology related to capabilities in a business operations graph;

extracting a term from a dataset representative of a project description of a proposed project;

generating, by the trained NLC, a likelihood vector comprising a plurality of confidence scores representing degrees of similarity between the term and respective capabilities in the business operations graph;

inputting the likelihood vector into a clustering algorithm that uses the likelihood vector as a feature vector, wherein the clustering algorithm uses k-means clustering and the feature vector to assign the term to a first cluster of a plurality of clusters, wherein the first cluster is representative of a capability from among the capabilities in the business operations graph;

detecting equal first and second probability values for first and second nodes, respectively, of a first level of the business operations graph, wherein the first and second probability values are part of a first classification result for the capability by a second machine-learning classifier;

assigning, responsive to detecting the equal probability values, the capability to a second-level node on a second level of the business operations graph;

discarding, responsive to a second classification result by the second machine-learning classifier containing outlier probability values, a second cluster of the plurality of clusters, wherein the second cluster is representative of a second capability used for determining the second classification result; and generating a visual indicator based, at least in part, on the assigning of the capability to the second-level node, wherein the generating of the visual indicator comprises generating a first visual indicator of the capability being assigned to the second-level node and a second visual indicator of a development sequence for the capability relative to another capability from the project description based at least in part on an association from the business operations graph between the first node and the second-level node of the business operations graph.

14. The computer usable program product of claim 13, wherein the stored program instructions are stored in a computer readable storage device in a data processing system, and wherein the stored program instructions are transferred over a network from a remote data processing system.

15. The computer usable program product of claim 13, wherein the extracting of the term from the dataset further comprises using natural language processing to identify a plurality of terms in the project description.

16. The computer usable program product of claim 15, further comprising:
forming the cluster representative of the capability based at least in part on a priority term of the plurality of terms; and
classifying the capability by associating the priority term with a business operation of the business operations graph.

17. A computer system comprising a processor and one or more computer readable storage media, and program instructions collectively stored on the one or more computer readable storage media, the program instructions executable by the processor to cause the processor to perform operations comprising:
training a first machine-learning classifier using a business domain corpus, wherein the first machine-learning classifier is a natural language classifier (NLC) and the training results in a trained NLC that identifies project description terminology related to capabilities in a business operations graph;

extracting a term from a dataset representative of a project description of a proposed project;

generating, by the trained NLC, a likelihood vector comprising a plurality of confidence scores representing degrees of similarity between the term and respective capabilities in the business operations graph;

inputting the likelihood vector into a clustering algorithm that uses the likelihood vector as a feature vector, wherein the clustering algorithm uses k-means clustering and the feature vector to assign the term to a first cluster of a plurality of clusters, wherein the first cluster is representative of a capability from among the capabilities in the business operations graph;

detecting equal first and second probability values for first and second nodes, respectively, of a first level of the business operations graph, wherein the first and second probability values are part of a first classification result for the capability by a second machine-learning classifier;

assigning, responsive to detecting the equal probability values, the capability to a second-level node on a second level of the business operations graph;

discarding, responsive to a second classification result by the second machine-learning classifier containing outlier probability values, a second cluster of the plurality of clusters, wherein the second cluster is representative of a second capability used for determining the second classification result; and generating a visual indicator based, at least in part, on the assigning of the capability to the second-level node, wherein the generating of the visual indicator comprises generating a first visual indicator of the capability being assigned to the second-level node and a second visual indicator of a development sequence for the capability relative to another capability from the project description based at least in part on an association from the business operations graph between the first node and the second-level node of the business operations graph.

18. The computer system of claim 17, wherein the extracting of the term from the dataset further comprises using natural language processing to identify a plurality of terms in the project description.

19. The computer system of claim 18, further comprising:

forming the cluster representative of the capability based at least in part on a priority term of the plurality of terms; and classifying the capability by associating the priority term with a business operation of the business operations graph.

* * * * *